United States Patent
Yellin et al.

(10) Patent No.: US 10,506,027 B2
(45) Date of Patent: Dec. 10, 2019

(54) SELECTING A CONTENT DELIVERY NETWORK

(71) Applicant: TENSERA NETWORKS LTD., Hod Hasharon (IL)

(72) Inventors: Daniel Yellin, Ra'anana (IL); David Ben Eli, Modiin (IL); Roee Peled, Givatayim (IL)

(73) Assignee: TENSERA NETWORKS LTD., Hod Hasharon (IL)

( * ) Notice: Subject to any disclaimer, the term of this patent is extended or adjusted under 35 U.S.C. 154(b) by 176 days.

(21) Appl. No.: 14/821,746

(22) Filed: Aug. 9, 2015

(65) Prior Publication Data
US 2016/0065662 A1 Mar. 3, 2016

Related U.S. Application Data

(60) Provisional application No. 62/042,259, filed on Aug. 27, 2014.

(51) Int. Cl.
| | | |
|---|---|---|
| H04L 29/08 | (2006.01) | |
| H04W 4/60 | (2018.01) | |
| H04L 12/24 | (2006.01) | |

(52) U.S. Cl.
CPC ...... H04L 67/1008 (2013.01); H04L 41/5051 (2013.01); H04L 67/2847 (2013.01); H04W 4/60 (2018.02); *H04L 41/509* (2013.01)

(58) Field of Classification Search
CPC ............. H04L 67/1008; H04L 67/2847; H04L 41/5051; H04L 41/509; H04L 4/003
See application file for complete search history.

(56) References Cited

U.S. PATENT DOCUMENTS

| | | | |
|---|---|---|---|
| 8,089,892 B2 | 1/2012 | Liu et al. | |
| 8,095,642 B1 * | 1/2012 | Martin | H04L 67/04 |
| | | | 709/224 |
| 8,341,245 B1 | 12/2012 | Roskind et al. | |
| 8,447,837 B2 | 5/2013 | Devanneaux et al. | |
| 8,566,867 B1 | 10/2013 | Yang et al. | |
| 8,601,052 B2 | 12/2013 | Mir et al. | |
| 8,625,667 B2 | 1/2014 | Cilli et al. | |
| 8,635,339 B2 | 1/2014 | Luna | |
| 8,655,404 B1 | 2/2014 | Singh et al. | |
| 8,775,564 B1 * | 7/2014 | Smart | H04L 67/1002 |
| | | | 709/203 |

(Continued)

OTHER PUBLICATIONS

Yan et al., "Fast App Launching for Mobile Devices Using Predictive User Context", MobiSys 12, 14 pages, Jun. 25-29, 2012.

(Continued)

*Primary Examiner* — Blake J Rubin
(74) *Attorney, Agent, or Firm* — Kligler & Associates

(57) ABSTRACT

Apparatus and methods are described, including a method for use with a first content delivery network (CDN) and a second CDN that are used by a content source. A processor is used to identify that a device is requesting an exchange of content with the content source, identify a property of the requested exchange of content, and based on the property, select one of the first CDN and the second CDN. Subsequently, content is exchanged between the device and the selected CDN. Other embodiments are also described.

9 Claims, 4 Drawing Sheets

(56) References Cited

U.S. PATENT DOCUMENTS

| | | | |
|---|---|---|---|
| 8,826,102 B2 | 9/2014 | Liu et al. | |
| 8,849,731 B2 | 9/2014 | Lymberopoulos et al. | |
| 8,886,176 B2 | 11/2014 | Luna et al. | |
| 8,909,736 B1* | 12/2014 | Bosch | H04L 67/1093 709/217 |
| 8,949,420 B2 | 2/2015 | Banavar et al. | |
| 9,009,103 B2 | 4/2015 | Rangarajan et al. | |
| 9,037,638 B1* | 5/2015 | Lepeska | H04L 67/2847 709/203 |
| 9,043,433 B2 | 5/2015 | Backholm | |
| 9,049,179 B2 | 6/2015 | Luna | |
| 9,094,464 B1* | 7/2015 | Scharber | H04L 45/026 |
| 9,111,309 B2 | 8/2015 | Howard et al. | |
| 9,118,623 B2 | 8/2015 | Devanneaux et al. | |
| 9,208,123 B2 | 12/2015 | Luna | |
| 9,247,019 B2 | 1/2016 | Luna et al. | |
| 9,256,484 B2 | 2/2016 | Stanley-Marbell et al. | |
| 9,264,780 B1* | 2/2016 | Stoica | H04L 67/1095 |
| 9,307,007 B2 | 4/2016 | Kapadia et al. | |
| 9,392,393 B2 | 7/2016 | Wood et al. | |
| 9,407,713 B2 | 8/2016 | Luna et al. | |
| 9,516,084 B2* | 12/2016 | Phillips | H04L 65/601 |
| 9,582,603 B1* | 2/2017 | Acharya | G06F 17/30902 |
| 10,002,373 B1* | 6/2018 | Voskamp | G06Q 30/0601 |
| 2002/0126135 A1* | 9/2002 | Ball | G06F 3/14 345/600 |
| 2002/0138565 A1* | 9/2002 | Kustov | H04L 29/06 709/203 |
| 2002/0198991 A1 | 12/2002 | Gopalakrishnan et al. | |
| 2003/0126232 A1 | 7/2003 | Mogul et al. | |
| 2004/0064577 A1* | 4/2004 | Dahlin | H04L 29/06 709/235 |
| 2005/0198191 A1 | 9/2005 | Carlson et al. | |
| 2006/0056336 A1 | 3/2006 | Dacosta | |
| 2007/0067424 A1* | 3/2007 | Raciborski | H04L 29/06027 709/223 |
| 2007/0260718 A1* | 11/2007 | Shenfield | G06F 17/3089 709/223 |
| 2007/0265967 A1* | 11/2007 | Kahn | G06F 21/10 705/51 |
| 2008/0134043 A1* | 6/2008 | Georgis | H04N 7/10 715/733 |
| 2009/0100459 A1* | 4/2009 | Riedl | H04N 21/2385 725/35 |
| 2009/0113253 A1* | 4/2009 | Wang | H04L 65/1013 714/48 |
| 2009/0172167 A1* | 7/2009 | Drai | H04L 45/125 709/226 |
| 2009/0292819 A1 | 11/2009 | Kandekar et al. | |
| 2010/0088369 A1 | 4/2010 | Sebastian et al. | |
| 2010/0094969 A1* | 4/2010 | Zuckerman | H04L 67/1008 709/219 |
| 2010/0161831 A1 | 6/2010 | Haas et al. | |
| 2010/0179986 A1* | 7/2010 | Sebastian | H04L 12/1859 709/203 |
| 2010/0199318 A1* | 8/2010 | Chang | H04N 7/17318 725/97 |
| 2010/0205049 A1* | 8/2010 | Long | G06Q 30/02 705/14.5 |
| 2011/0029670 A1 | 2/2011 | Klein et al. | |
| 2011/0093607 A1* | 4/2011 | Wang | H04L 65/4084 709/231 |
| 2011/0137973 A1* | 6/2011 | Wei | H04L 67/1008 709/202 |
| 2011/0185041 A1* | 7/2011 | Hunt | H04L 65/1069 709/219 |
| 2011/0295942 A1* | 12/2011 | Raghunath | H04L 45/00 709/203 |
| 2012/0023226 A1* | 1/2012 | Petersen | H04W 4/18 709/224 |
| 2012/0072671 A1 | 3/2012 | Chirca et al. | |
| 2012/0131623 A1* | 5/2012 | McDysan | H04N 21/2402 725/97 |
| 2012/0185370 A1* | 7/2012 | Davie | G06Q 30/04 705/34 |
| 2012/0198075 A1* | 8/2012 | Crowe | H04L 67/2847 709/226 |
| 2012/0289147 A1* | 11/2012 | Raleigh | H04L 67/2847 455/3.06 |
| 2013/0013730 A1* | 1/2013 | Li | H04L 65/80 709/217 |
| 2013/0046883 A1* | 2/2013 | Lientz | H04L 41/0816 709/224 |
| 2013/0103785 A1* | 4/2013 | Lyon | H04N 21/2385 709/217 |
| 2013/0159383 A1* | 6/2013 | Tuliani | H04L 67/2842 709/203 |
| 2013/0246570 A1* | 9/2013 | Raciborski | G06F 17/30194 709/217 |
| 2013/0263180 A1 | 10/2013 | Yang et al. | |
| 2013/0290557 A1 | 10/2013 | Baratz | |
| 2013/0343450 A1 | 12/2013 | Solka et al. | |
| 2014/0032718 A1 | 1/2014 | Berger et al. | |
| 2014/0059156 A1 | 2/2014 | Freeman, II et al. | |
| 2014/0074961 A1* | 3/2014 | Liu | H04L 67/1095 709/213 |
| 2014/0089998 A1* | 3/2014 | Buehl | H04N 21/23113 725/93 |
| 2014/0094163 A1 | 4/2014 | Widdowson et al. | |
| 2014/0108671 A1* | 4/2014 | Watson | H04L 65/4084 709/231 |
| 2014/0150019 A1 | 5/2014 | Ma et al. | |
| 2014/0164584 A1* | 6/2014 | Joe | H04L 12/5689 709/223 |
| 2014/0181186 A1* | 6/2014 | Stevens | H04L 67/322 709/203 |
| 2014/0188974 A1* | 7/2014 | Ioannidis | H04L 67/2842 709/202 |
| 2014/0219088 A1 | 8/2014 | Oyman et al. | |
| 2014/0279026 A1 | 9/2014 | Nath et al. | |
| 2014/0362768 A1 | 12/2014 | Wood et al. | |
| 2014/0364104 A1 | 12/2014 | Wood et al. | |
| 2014/0366041 A1 | 12/2014 | Stanley-Marbell et al. | |
| 2014/0366042 A1 | 12/2014 | Chan et al. | |
| 2014/0372511 A1 | 12/2014 | Kapadia et al. | |
| 2014/0373032 A1* | 12/2014 | Merry | G06F 9/54 719/328 |
| 2014/0379840 A1 | 12/2014 | Dao | |
| 2015/0012656 A1* | 1/2015 | Phillips | H04L 47/26 709/226 |
| 2015/0120821 A1 | 4/2015 | Bendell et al. | |
| 2015/0160931 A1* | 6/2015 | Glazer | G06F 9/452 717/109 |
| 2015/0180931 A1* | 6/2015 | Marr | H04L 65/607 713/165 |
| 2015/0241941 A1* | 8/2015 | Luna | H04W 52/0229 713/320 |
| 2015/0256641 A1 | 9/2015 | Agarwal et al. | |
| 2015/0296505 A1 | 10/2015 | Luna et al. | |
| 2015/0347204 A1 | 12/2015 | Stanley-Marbell et al. | |
| 2015/0347205 A1 | 12/2015 | Stanley-Marbell et al. | |
| 2015/0347907 A1 | 12/2015 | Mathew et al. | |
| 2015/0347908 A1 | 12/2015 | Mathew et al. | |
| 2015/0350807 A1 | 12/2015 | Andrews et al. | |
| 2015/0350885 A1 | 12/2015 | Stanley-Marbell et al. | |
| 2015/0351033 A1 | 12/2015 | Stanley-Marbell et al. | |
| 2015/0365904 A1 | 12/2015 | Luna et al. | |
| 2016/0191393 A1* | 6/2016 | Lermant | H04L 67/2842 709/223 |
| 2016/0191651 A1 | 6/2016 | Balakrishnan et al. | |
| 2016/0191664 A1 | 6/2016 | Balakrishnan et al. | |
| 2016/0205028 A1 | 7/2016 | Luna et al. | |
| 2017/0272485 A1* | 9/2017 | Gordon | H04N 21/222 |
| 2017/0295132 A1* | 10/2017 | Li | H04L 61/1511 |

OTHER PUBLICATIONS

Andtaus et al., "File Prefetching for Mobile Devices Using On-Line Learning", 10 pages, Aug. 2008.

(56) References Cited

OTHER PUBLICATIONS

International Application # PCT/IB2015/052873 Search Report dated Aug. 12, 2015.
Yellin et al., U.S. Appl. No. 14/691,597, filed Apr. 21, 2015.
Yellin et al., U.S. Appl. No. 14/821,747, filed Aug. 9, 2015.
Yellin et al., PCT/IB2015/057698 Application dated Oct. 8, 2015.
Pantos et al., "HTTP Live Streaming draft-pantos-http-live-streaming-13", Internet-Draft, 56 pages, Apr. 16, 2014.
Apple Inc., "HTTP Live Streaming Overview—Introduction", Mac Developer Library, 3 pages, Feb. 11, 2014.
Apple Inc., "Example Playlist Files for use with HTTP Live Streaming", iOS Developer Library, Technical Note TN2288, 16 pages, May 9, 2012.
International Application # PCT/IB2015/057698 Search Report dated Feb. 11, 2016.

\* cited by examiner

SELECTING A CONTENT DELIVERY NETWORK

CROSS-REFERENCE TO RELATED APPLICATIONS

The present application claims the benefit of U.S. Provisional Patent Application 62/042,259, filed Aug. 27, 2014, whose disclosure is incorporated herein by reference.

FIELD OF THE INVENTION

Embodiments of the present invention relate to exchanging content with a content delivery network (CDN).

BACKGROUND

Content providers may use a CDN to deliver content to users.

SUMMARY OF THE INVENTION

There is provided, in accordance with some embodiments of the present invention, a method for use with a first content delivery network (CDN) and a second CDN that are used by a content source. The method includes using a processor to identify that a device is requesting an exchange of content with the content source, identify a property of the requested exchange of content, and based on the property, select one of the first CDN and the second CDN. Subsequently, the content is exchanged between the device and the selected CDN.

In some embodiments, identifying the property of the requested exchange of content includes identifying that the requested exchange of content is a requested prefetching of the content from the content source.

In some embodiments,
a speed of the first CDN is less than a speed of the second CDN, and
selecting one of the first CDN and the second CDN includes selecting the first CDN, based on the requested exchange of content being a requested prefetching of the content from the content source.

In some embodiments, the method further includes, prior to selecting the first CDN, using the processor to identify that the speed of the first CDN is less than the speed of the second CDN.

In some embodiments,
a cost-per-volume-of-content of the first CDN is less than a cost-per-volume-of-content of the second CDN, and
selecting one of the first CDN and the second CDN includes selecting the first CDN, based on the requested exchange of content being a requested prefetching of the content from the content source.

In some embodiments, the processor is a processor of the device, the method including using the processor of the device.

In some embodiments, the method further includes using the processor to initiate the exchange of content between the device and the selected CDN by specifying a uniform resource identifier that (i) is associated with the selected CDN, and (ii) is not associated with the other CDN.

In some embodiments,
a speed of the first CDN is less than a speed of the second CDN,
identifying the property of the requested exchange of content includes identifying that the device is requesting to download (i) a first portion of the content, for immediate consumption, and (ii) a second portion of the content, not for immediate consumption,
selecting one of the first CDN and the second CDN includes (i) selecting the first CDN for download of the second portion of the content, and (ii) selecting the second CDN for download of the first portion of the content, and
exchanging the content between the device and the selected CDN includes (i) downloading the second portion of the content from the first CDN, and (ii) downloading the first portion of the content from the second CDN.

In some embodiments, the method further includes using the processor to estimate a likelihood that a user will consume the second portion of the content, and downloading the second portion of the content includes downloading the second portion of the content in response to the likelihood being greater than a threshold.

In some embodiments,
a cost-per-volume-of-content of the first CDN is less than a cost-per-volume-of-content of the second CDN,
identifying the property of the requested exchange of content includes identifying that the device is requesting to download (i) a first portion of the content, for immediate consumption, and (ii) a second portion of the content, not for immediate consumption,
selecting one of the first CDN and the second CDN includes (i) selecting the first CDN for download of the second portion of the content, and (ii) selecting the second CDN for download of the first portion of the content, and
exchanging the content between the device and the selected CDN includes (i) downloading the second portion of the content from the first CDN, and (ii) downloading the first portion of the content from the second CDN.

In some embodiments, identifying that the device is requesting the exchange of content with the content source includes identifying that the device is requesting to upload the content to the content source.

In some embodiments, identifying that the device is requesting the exchange the content with the content source includes identifying that the device is requesting to download the content from the content source.

There is further provided, in accordance with some embodiments of the present invention, a method for use with a content delivery network (CDN), the CDN having a first content-delivery route and a second content-delivery route. The method includes using a processor to identify that a device is requesting an exchange of content with the CDN, identify a property of the requested exchange of content, and based on the property, select one of the first content-delivery route and the second content-delivery route. Subsequently, the content is exchanged between the device and the CDN, via the selected content-delivery route.

In some embodiments, the processor is a processor of a server belonging to the CDN, the method including using the processor of the server belonging to the CDN.

There is further provided, in accordance with some embodiments of the present invention, apparatus for use with a first content delivery network (CDN) and a second CDN that are used by a content source. The apparatus includes a processor configured to identify that a device is requesting an exchange of content with the content source, identify a property of the requested exchange of content, and based on the property, select one of the first CDN and the second CDN for the exchange of content.

In some embodiments, the processor is configured to identify the property of the requested exchange of content by identifying that the requested exchange of content is a requested prefetching of the content from the content source.

In some embodiments, a speed of the first CDN is less than a speed of the second CDN, and
the processor is configured to:
select the first CDN, based on the requested exchange of content being a requested prefetching of the content from the content source, and
select the second CDN, based on the requested exchange of content not being a requested prefetching of the content from the content source.

In some embodiments, the processor is further configured to, prior to selecting the first CDN, identify that the speed of the first CDN is less than the speed of the second CDN.

In some embodiments,
a cost-per-volume-of-content of the first CDN is less than a cost-per-volume-of-content of the second CDN, and
the processor is configured to:
select the first CDN, based on the requested exchange of content being a requested prefetching of the content from the content source, and
select the second CDN, based on the requested exchange of content not being a requested prefetching of the content from the content source.

In some embodiments, the processor is a processor of the device.

In some embodiments, the processor is further configured to initiate the exchange of content between the device and the selected CDN by specifying a uniform resource identifier that (i) is associated with the selected CDN, and (ii) is not associated with the other CDN.

In some embodiments,
a speed of the first CDN is less than a speed of the second CDN,
the processor is configured to identify the property of the requested exchange of content by identifying that the device is requesting to download (i) a first portion of the content, for immediate consumption, and (ii) a second portion of the content, not for immediate consumption, and
the processor is configured to select one of the first CDN and the second CDN by (i) selecting the first CDN for download of the second portion of the content, and (ii) selecting the second CDN for download of the first portion of the content.

In some embodiments,
the processor is further configured to estimate a likelihood that a user will consume the second portion of the content, and
the processor is configured to select the first CDN for download of the second portion of the content in response to the likelihood being greater than a threshold.

In some embodiments,
a cost-per-volume-of-content of the first CDN is less than a cost-per-volume-of-content of the second CDN,
the processor is configured to identify the property of the requested exchange of content by identifying that the device is requesting to download (i) a first portion of the content, for immediate consumption, and (ii) a second portion of the content, not for immediate consumption, and
the processor is configured to select one of the first CDN and the second CDN by (i) selecting the first CDN for download of the second portion of the content, and (ii) selecting the second CDN for download of the first portion of the content.

There is further provided, in accordance with some embodiments of the present invention, apparatus for use with a content delivery network (CDN), the CDN having a first content-delivery route and a second content-delivery route. The apparatus includes a processor configured to identify that a device is requesting an exchange of content with the CDN, identify a property of the requested exchange of content, and based on the property, select one of the first content-delivery route and the second content-delivery route for the exchange of content.

There is further provided, in accordance with some embodiments of the present invention, a computer software product for use with a first content delivery network (CDN) and a second CDN that are used by a content source. The product includes a tangible non-transitory computer-readable medium in which program instructions are stored, which instructions, when read by one or more processors, cause the one or more processors to identify that a device is requesting an exchange of content with the content source, identify a property of the requested exchange of content, and based on the property, select one of the first CDN and the second CDN for the exchange of content.

The present invention will be more fully understood from the following detailed description of embodiments thereof, taken together with the drawings, in which:

DETAILED DESCRIPTION OF EMBODIMENTS

Overview

Figure 1:
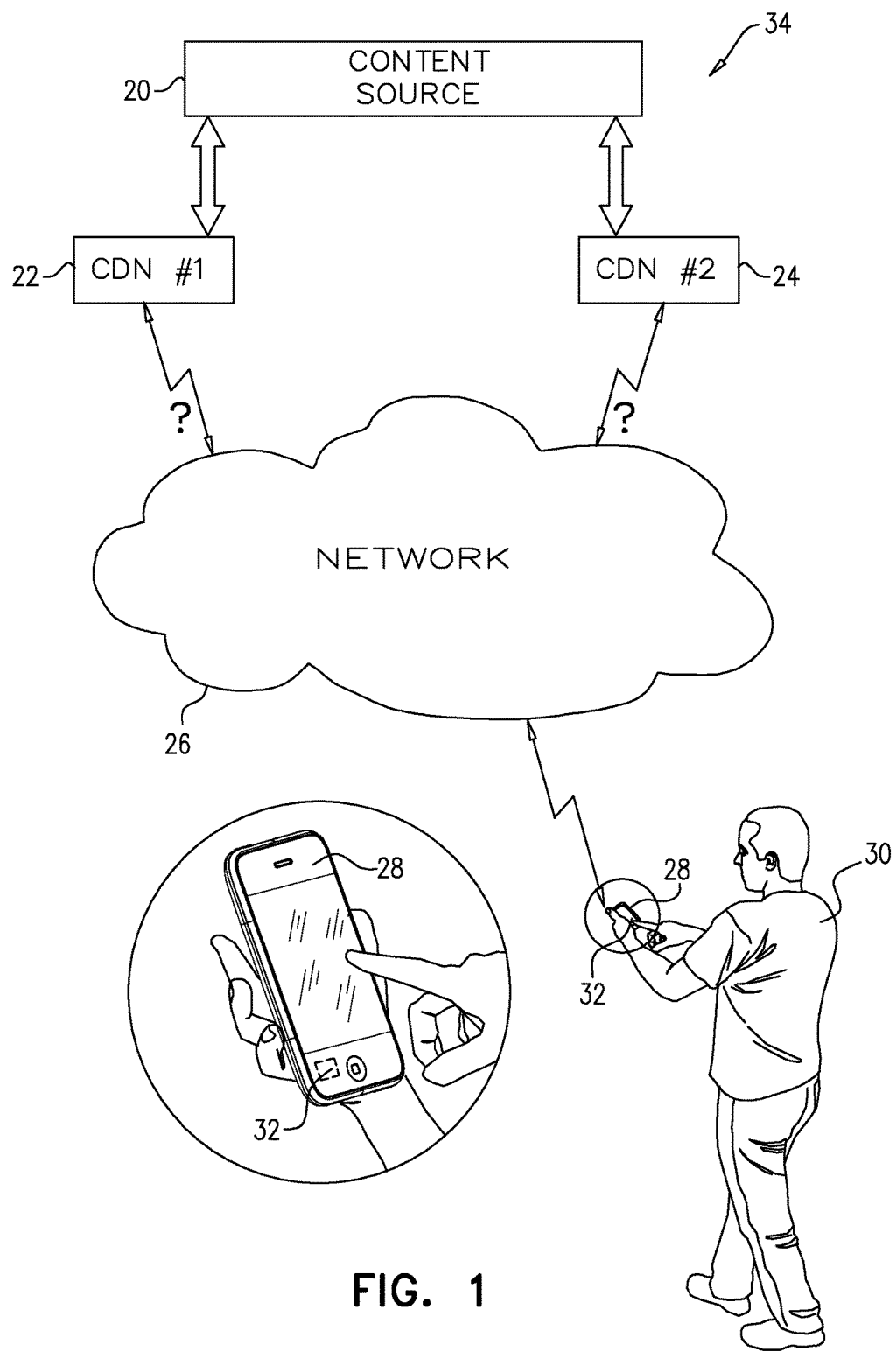
FIG. 1 is a schematic illustration of a system for content exchange using multiple CDNs, in accordance with some embodiments of the present invention.

A content provider, such as a news provider, video streaming provider or other content provider, may use a CDN to deliver content to users. The content provider may pay the CDN operator for use of the CDN, the payment typically being a function of the volume of content exchanged via the CDN, as well as the quality of service provided by the CDN. For example, a first CDN that has a lower speed (by having less bandwidth, and/or higher latency), and/or has a higher packet loss rate, than a second CDN, is typically less expensive to use (i.e., has a lower cost-per-volume-of-content) than the second CDN. Often, a content provider uses a single CDN globally, or a single CDN per geographical area.

In the context of the claims and specification of the present application, the "speed" of a CDN refers to the speed at which content is exchanged between the CDN and the device that is downloading or uploading the content. Furthermore, it is noted that references to the speed or to other quality-of-service measures of a CDN are generally with respect to the time of the exchange of content. For example, even if a first CDN is generally faster than the second CDN, the first CDN may be "slower" than the second CDN due to the current volume of traffic on the first CDN.

In the context of the present claims and specification, the term "content source" generally refers to any systems or servers used by the content provider to host the provider's content. The content source may be said to "use" a CDN if content is exchanged between the content source and devices via the CDN. For example, a content source that uses a CDN may transfer content to the CDN, e.g., following updates to the content that is hosted on the content source, and/or at regular intervals. A device, such as a mobile phone or a computer, may then download content from the CDN. Conversely, the CDN may transfer content to the content source, e.g., upon a device uploading the content to the CDN. (In light of the above, it is noted that both the content source and the content provider that uses the content source may be said to be "using" a particular CDN. Similarly, both the content source and the content provider may be said to be "providing" content.)

In the context of the claims and specification of the present application, content is "for immediate consumption" if it may be assumed that the user of the device would like to consume the content as soon as possible. Such content may also be described as "real-time" content, or content that is "for real-time consumption."

The amount of content exchanged on a daily basis over wired and wireless networks is rapidly increasing, and this trend is expected to intensify in the coming years, in particular for wireless networks. Unfortunately, today's wireless networks are bandwidth-limited, and the conventional approach of deploying more access points or base stations to increase capacity can no longer cost-effectively cope with the traffic growth in these networks. In some cases, a high volume of traffic may lead to slow exchanges of content with a CDN.

Hence, the present inventors have realized that, in some cases, it may be advantageous for a content source to use two (or more) CDNs in a single geographical area. Furthermore, the present inventors have realized that rather than always selecting the faster CDN (i.e., the CDN that provides shorter exchange durations) for a particular exchange of content, it may be advantageous to select a CDN based on one or more properties of the requested exchange of content. Hence, in practice, the slower CDN may sometimes be selected.

For example, in some cases, a device may request to prefetch certain content, i.e., download the content to the user's device before the user requests the content. (Subsequently, when the user requests the content, there is no need to access the network; rather, the device retrieves the content from memory.) Since the user is generally indifferent to the speed of a prefetching operation (in that the user has not yet requested the content), and furthermore, typically is not even aware of the prefetching operation, there may be little disadvantage to always using the less-expensive and/or slower CDN for prefetching. On the other hand, there may be significant advantages to using the less-expensive and/or slower CDN, such as the following:

(i) The content provider may reduce costs by using the less expensive CDN for prefetching.

(ii) Using the slower CDN for prefetching may help distribute traffic more effectively. For example, users who request "real-time" data (i.e., data for immediate consumption) typically expect the data to be downloaded relatively quickly. In some cases, if the faster CDN would be occupied with too many prefetch requests, the faster CDN might be slowed to the extent that the first CDN is no longer "fast enough" for real-time requests. Thus, by using the slower CDN for prefetching, the faster CDN remains "reserved" for real-time requests.

On the other hand, if the device is requesting to download content for real-time consumption, the faster CDN may be selected for the download. For real-time consumption, the user typically wants as high a download speed as possible, and thus, it is typically advantageous to use the faster CDN.

Further to the aforementioned realization, embodiments described herein provide a system, and techniques, for selecting a CDN from multiple CDNs. The description that follows refers to a processor that carries out the disclosed techniques. In some embodiments, the processor is the processor of the device, and is configured to perform the selection of the CDN by software installed on the device. In other embodiments, the processor is in one or more servers belonging to one or more of the CDNs.

In a typical embodiment, the processor first identifies that a device is requesting to exchange content with (i.e., download content from, or upload content to) a content source. The processor then identifies a property of the requested exchange of content, and selects the appropriate CDN based on the property. For example, the processor may select the less-expensive and/or slower CDN, based on the requested exchange of content being a requested prefetching of content.

Embodiments described herein may be applied to any situation in which two or more CDNs having different respective sets of properties are available. For example, the CDNs may differ from each other in one or more quality-of-service properties such as speed and number of dropped packets, in cost, and/or in any other properties. By selecting one of the CDNs based on the properties of the requested exchange of content, significant advantages may be realized. For example, as noted above, the techniques described herein may allow for more effective distribution of traffic, and/or allow the content provider to reduce costs while maintaining a quality of service that is acceptable to consumers.

Embodiments of the present invention may be used for any relevant type of content, including visual content (e.g., text content such as news articles in html format, or image content such as images in jpeg format), audio content (e.g., podcasts in mp3 format), and audio/visual content (e.g., video clips in mpeg format).

System Description

Reference is now made to FIG. 1, which is a schematic illustration of a system 34 for content exchange using multiple CDNs, in accordance with some embodiments of the present invention. As shown in FIG. 1, system 34 includes a content source 20, which uses a first CDN 22 and a second CDN 24 to deliver content. For purposes of the description below, it is assumed that the first CDN 22 is slower, but less expensive, than second CDN 24. For example, the first CDN may have a higher latency than the second CDN, such that the speed of the first CDN is less than the speed of the second CDN.

A user 30 operates a device 28, such as a mobile phone, tablet computer, desktop computer, or any other device in communication with a network 26. (Network 26 comprises the network to which device is connected, which may be connected to the Internet. In general, network 26 may include any number of interconnected wireless or wired networks.) Using device 28, user 30 downloads content that is provided by the content source, via network 26. To download content, the user may use the device to specify a uniform resource identifier (URI), such as a uniform resource locator (URL). For example, the user may use the device to specify the URL "http://www.cnn.com". Upon the user specifying the URI, a processor 32 selects one of the CDNs, using techniques described hereinbelow. Subsequently, content is downloaded to the device from the selected CDN, e.g., upon processor 32 initiating the download from the selected CDN.

The question marks in FIG. 1 indicate that content may be downloaded from any one or more of the CDNs to device 28, the uncertainty being resolved upon the processor selecting the appropriate CDN(s).

In some cases, the device may download content via network 26 (e.g., from a particular web portal) even without any explicit instruction from the user; for example, the device may prefetch some or all of the content. As further described hereinbelow with reference to FIG. 3, in such cases, a CDN that is selected by processor 32 is used for the prefetch.

It is noted that content source 20 may use any number of additional CDNs, not shown in FIG. 1. In general, embodiments described herein may be used to select one CDN from any number of CDNs, for a particular exchange of content.

Figure 2:
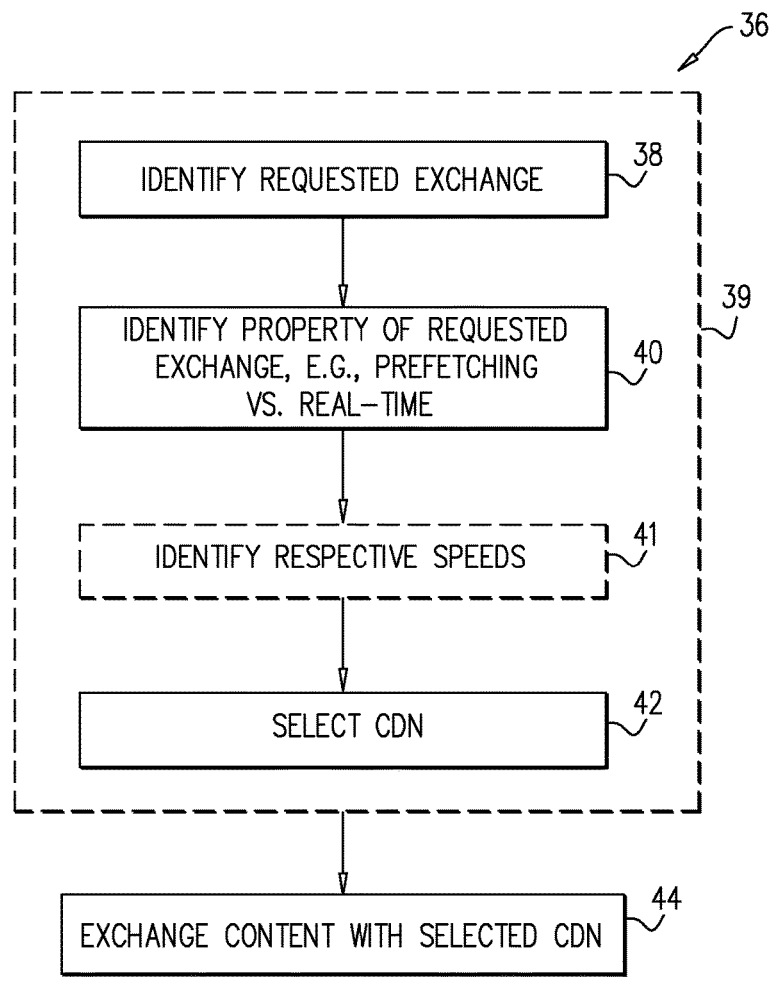
FIG. 2 shows a flow chart for a method for exchanging content, in accordance with some embodiments of the present invention.

Reference is now made to FIG. 2, which shows a flow chart for a method 36 for exchanging content, in accordance with some embodiments of the present invention. Method 36 includes two parts. The first part 39 of method 36, described immediately hereinbelow, is executed by processor 32 (FIG. 1) to select a CDN. Subsequently to the selection of the CDN, content is exchanged between device 28 (FIG. 1) and the selected CDN, at a content-exchanging step 44. In some embodiments, the processor initiates the exchange of content, by instructing the CDN and/or the device to begin exchanging the content.

First part 39 of method 36 begins with a request-identifying step 38, at which processor 32 identifies that device 28 is requesting to exchange content with content source 20 (FIG. 1). For example, the processor may identify that the user has entered a URL into a browser installed on the device, or that an application installed on the device is requesting to prefetch content from the content source. Processor 32 then identifies a property of the requested exchange of content, at a property-identifying step 40. For example, processor 32 may identify whether the requested exchange of content is a requested prefetching of the content from the content source.

Based on the identified property of the requested exchange, at a selecting step 42, the processor selects one of the CDNs. For example, in response to identifying that the device is requesting to prefetch content, the processor may select the first CDN for the prefetching. Since the user does not expect to consume the prefetched content in real-time (and furthermore, may not even be aware of the prefetching), the selection of the first CDN for the prefetching may help distribute traffic more effectively, and/or may help the content provider reduce costs, as described hereinabove.

In some embodiments, the processor is configured to select a particular CDN based on the identified property of the requested exchange, without explicitly identifying the absolute or relative respective speeds of the CDNs. For example, the processor may be configured to always select the first CDN for prefetching, and the second CDN for real-time downloads.

In other embodiments, the processor explicitly identifies, at a speed-identifying step 41, the respective speeds of the CDNs. Such identification may be based on recent exchanges of content, e.g., exchanges of content that occurred within the last few minutes or hours. Alternatively or additionally, the processor may "test" the CDNs by exchanging a small amount of data with each CDN; subsequently, the processor may compute the respective speeds of the CDNs from the respective test exchange durations. Such speed identification may be particularly useful if one or more of the speeds tend to fluctuate significantly. For example, if the first CDN happens to be slower than the second CDN on a particular day, the processor may select the first CDN for prefetching, even if the first CDN has historically been faster than the second CDN. In some embodiments, speed-identifying step 41 is executed prior to property-identifying step 40 and/or request-identifying step 38.

Aside from speed, the selection of one of the CDNs may be based on any other relevant properties of the CDNs, e.g., properties that relate to the quality of service provided by, or the cost of, the CDNs. In some embodiments, the processor identifies such properties. For example, the processor may identify respective packet loss rates of the CDNs (e.g., by requesting such information from the network card of device 28), and/or respective costs-per-volume-of-content. The processor may then select the appropriate CDN for the exchange, based on the identified properties.

Figure 3:
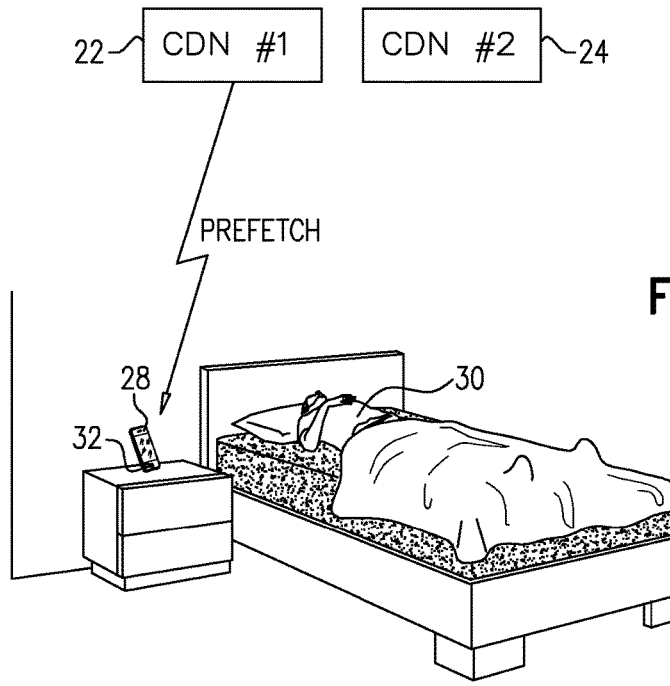
FIGS. 3-5 are schematic illustrations of the system of FIG. 1 in operation, in accordance with some embodiments of the present invention.
Figure 4:
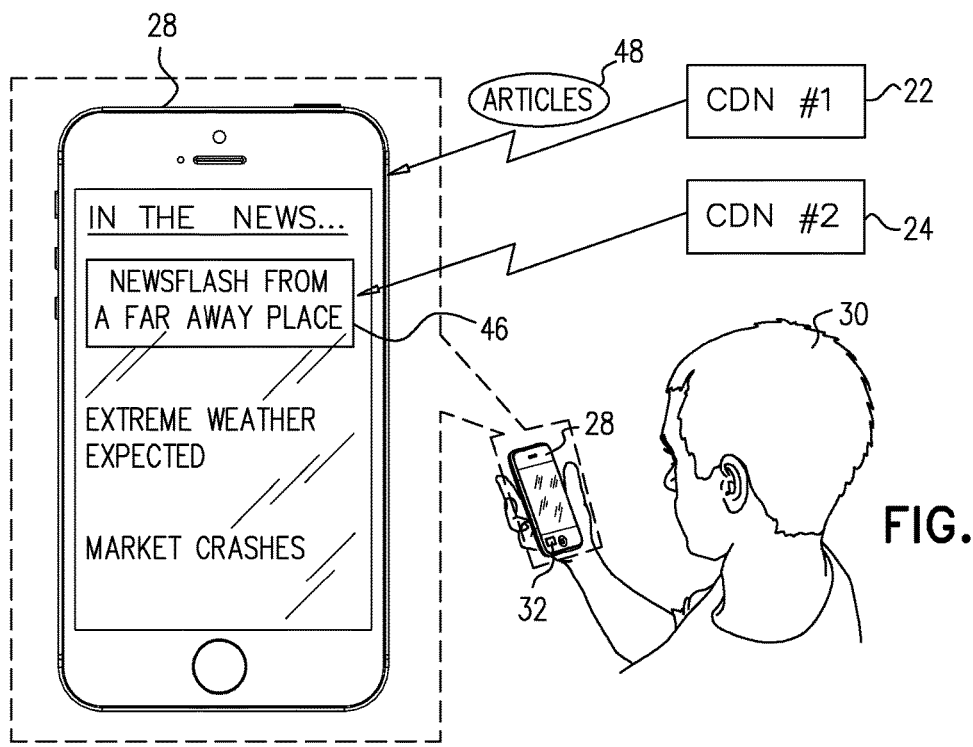

Reference is now additionally made to FIGS. 3 and 4, which are schematic illustration of system 34 in operation, in accordance with some embodiments of the present invention. Each of FIGS. 3 and 4 depicts a typical scenario in which method 36 may be practiced. (For simplicity, network 26 and content source 20 are omitted from FIGS. 3 and 4.)

In FIG. 3, while user 30 sleeps, device 28 requests to prefetch content, such as the morning news, for the user to read upon awakening. Processor 32 identifies, at request-identifying step 38 and property-identifying step 40, that the device is requesting to prefetch the content. In response thereto, the processor selects the first CDN (which is slower, but also less expensive, than the second CDN) for the prefetching. As noted above, the selection of the first CDN may allow for more effective distribution of traffic, and/or may allow the content provider to reduce costs, without noticeably compromising the quality of service provided.

In FIG. 4, device 28 requests to download news content from the content source, the news content including (i) a plurality of headlines 46, and (ii) a plurality of articles 48 that are associated with the respective headlines 46. While headlines 46 are for immediate (real-time) consumption, articles 48 are not for immediate consumption. In fact, the articles may not, in practice, be consumed at all; for example, the user might view a particular article only if he chooses to click on the appropriate headline, or to scroll down from the headline.

Subsequently to identifying the requested exchange of content, processor 32 identifies, at property-identifying step 40, that the requested content includes two portions—a first portion (in this case, headlines 46) that is for immediate consumption, and a second portion (in this case, articles 48) that is not for immediate consumption. In response thereto, the processor selects the first CDN for downloading the second portion of the content, and the second CDN for downloading the first portion of the content. Thus, the first CDN may download the second portion of the content while the user consumes the first portion of the content, such that the user may not notice the slower download of the second portion, particularly if the user chooses not to consume the second portion at all.

In some embodiments, the processor estimates a likelihood that the user will consume the second portion of the content. For example, with reference to the example headlines shown in FIG. 4, the processor may estimate a likelihood that the user will click on the "Extreme weather expected" headline, based on, for example, how frequently the user has, in the past, read weather-related articles, and/or based on the general popularity of the "Extreme weather expected" article amongst other users. The processor may then compare the likelihood to a threshold. If the likelihood is greater than the threshold, the processor may choose to prefetch the article (e.g., using the first CDN); on the other hand, if the likelihood is less than the threshold, the processor may choose not to prefetch the article.

As shown in FIGS. 1, 3, and 4, processor 32 is typically the processor of device 28. In such typical embodiments, processor 32 may be configured to perform the techniques described herein by software that is installed on the device. For example, a content provider may provide a "smartphone app" that allows users to consume content from the provider's content source, the smartphone app including program instructions that, when read by the processor, cause the processor of the smartphone to perform the techniques described herein. Since, as described hereinabove, techniques described herein may allow the content provider to reduce costs, the provision of such an app to users may be advantageous to the content provider. Alternatively or additionally, a web browser installed on the device, a dedicated software agent installed on the device, and/or the operating system of the device, may include program instructions that, when read by the processor, cause the processor to perform the techniques described herein.

In some embodiments, each of the CDNs is associated with a respective unique URI such as a URL, and the processor initiates the exchange of content by specifying the URI that is associated with the selected CDN.

In alternative embodiments, processor 32 is not located in device 28. For example, as further described hereinbelow with reference to FIG. 5, processor 32 may be a processor, or a group of processors, in one or more servers belonging to one or more of the CDNs. In such embodiments, upon selecting the CDN for the exchange of content, the processor may initiate the exchange of content, by instructing the selected CDN to begin exchanging content with the device.

Figure 5:
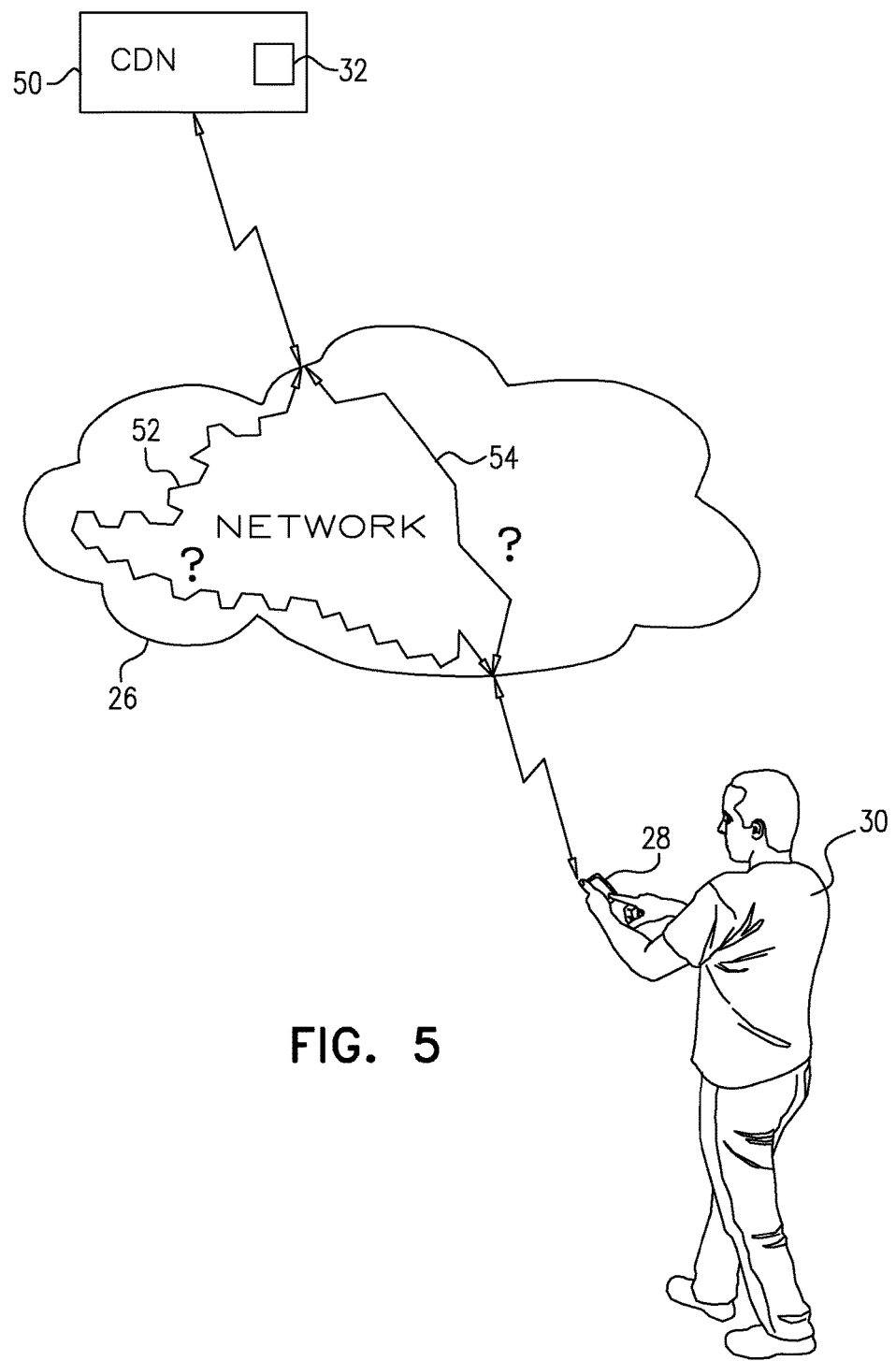

Reference is now made to FIG. 5, which is a schematic illustration of system 34 in operation, in accordance with some embodiments of the present invention. FIG. 5 shows device 28 requesting to exchange content with a CDN 50 having two or more content-delivery routes, including a first content-delivery route 52 and a second content-delivery route 54. In general, the principles of operation depicted in FIG. 5 are similar to those depicted in FIG. 1; FIG. 5 differs from FIG. 1 mainly in that the selection of one CDN from multiple CDNs is replaced by the selection of one content-delivery route from multiple content-delivery routes.

As described hereinabove with reference to previous figures, processor 32 identifies that the device is requesting to exchange content with CDN 50, and further identifies a property of the requested exchange of content. (For example, the processor may identify whether the requested exchange is a requested prefetching of content.) Based on the property, the processor then selects one of the content-delivery routes. For example, FIG. 5 depicts first content-delivery route 52 as having a lesser speed than that of second content-delivery route 54. Therefore, in response to the requested exchange being a requested prefetching of content, the processor may select the first content-delivery route, rather than the second content-delivery route. Subsequently, the device may exchange content with the CDN via the first content-delivery route, e.g., by the processor instructing the CDN to deliver content to the device via the first content-delivery route.

FIG. 5 depicts processor 32 as being a processor of a server belonging to the CDN. (In such embodiments, processor 32 is typically a processor of a server at the "front end" of the CDN, which typically "sees" the request from the device before any other server in the CDN.) In such embodiments, processor 32 may be configured to perform the techniques described herein by software installed on the CDN, in that program instructions included in the software, when read by the processor, cause the processor to perform the techniques described herein.

In general, it may be advantageous for a CDN operator to use specially-configured processor 32 to select an appropriate content-delivery route for each exchange of content. For example, by routing prefetched content via the slower content-delivery route, the CDN may distribute traffic more effectively (by reserving the faster content-delivery route for content that is for real-time consumption), thus improving the overall quality of service provided by the CDN. Similarly, a CDN operator operating an aggregation of CDNs may benefit by using specially-configured processor 32 to select an appropriate CDN for each exchange of content.

In some embodiments, both the device and the CDN(s), and/or other servers along the content-exchange pathway (e.g., a Domain Name System server) may include a processor that is specially-configured to perform the techniques described herein.

Although the description above relates mainly to downloading of content, it is noted that apparatus and techniques described herein may also be used for uploading content from a device. Thus, for example, content that is for real-time consumption (such as a breaking news story uploaded by a reporter) may be uploaded to a faster CDN, while other content may be uploaded to a slower and/or less expensive CDN.

In general, processor 32 may be embodied as a single processor, or a cooperatively networked or clustered set of processors. Processor 32 is typically a programmed digital computing device comprising a central processing unit (CPU), random access memory (RAM), non-volatile secondary storage, such as a hard drive or CD ROM drive, network interfaces, and/or peripheral devices. Program code, including software programs, and/or data are loaded into the RAM for execution and processing by the CPU and results are generated for display, output, transmittal, or storage, as is known in the art. The program code and/or data may be downloaded to the computer in electronic form, over a network, for example, or it may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for content delivery, comprising:
identifying cases in which a user device is requesting to obtain a given content from a content source, and distinguishing between (i) cases in which the given content is prefetched before being requested by a user of the user device for immediate real-time consumption, and (ii) cases in which the same given content is fetched in response to a request from the user for immediate real-time consumption;
in the cases in which the user device is requesting to fetch the given content for immediate real-time consumption by the user, fetching the given content to the user device via a first CDN used by the content source for distributing the given content; and
in the cases in which the user device is requesting to prefetch the given content before the given content is requested by the user for immediate real-time consumption, prefetching the given content to the user device via a second Content Delivery Network (CDN), which is also used by the content source for distributing the same given content, wherein the second CDN is slower than but has a lower cost-per-volume-of-content than the first CDN,
wherein distinguishing between the cases is performed by a processor in the user device.

2. The method according to claim 1, wherein fetching the given content for immediate real-time consumption comprises accessing a first uniform resource identifier (URI) that is associated with the first CDN, and wherein prefetching the given content comprises accessing a different, second URI that is associated with the second CDN.

3. The method according to claim 1, wherein distinguishing between the cases comprises identifying that the user device is requesting to (i) prefetch a first portion of the given content, and (ii) fetch a second portion of the given content for immediate real-time consumption, and, in response, prefetching the first portion via the second CDN and fetching the second portion via the first CDN.

4. The method according to claim 3, further comprising estimating a likelihood that the user will consume the second portion of the given content, wherein fetching the second portion of the given content is performed only in response to the likelihood being greater than a threshold.

5. An apparatus for content delivery, comprising:
a network interface for communicating at least with first and second Content Delivery Networks (CDNs) used by a content source for distributing content; and
one or more processors, configured to:
identify cases in which a user device is requesting to obtain a given content from the content source, and distinguishing between (i) cases in which the given content is prefetched before being requested by a user of the user device for immediate real-time consumption, and (ii) cases in which the same given content is fetched in response to a request from the user for immediate real-time consumption;
in the cases in which the user device is requesting to fetch the given content for immediate real-time consumption by the user, fetching the given content to the user device via the first CDN used by the content source for distributing the given content; and
in the cases in which the user device is requesting to prefetch the given content before the given content is requested by the user for immediate real-time consumption, prefetch the given content to the user device via the second CDN, which is also used by the content source for distributing the same given content, wherein the second CDN is slower than but has a lower cost-per-volume-of-content than the first CDN,
wherein distinguishing between the cases is performed by a processor in the user device.

6. The apparatus according to claim 5, wherein the one or more processors are configured to fetch the given content for immediate real-time consumption by accessing a first uniform resource identifier (URI) that is associated with the first CDN, and to prefetch the given content by accessing a different, second URI that is associated with the second CDN.

7. The apparatus according to claim 5, wherein the one or more processors are configured to identify that the user device is requesting (i) to prefetch a first portion of the given content, and (ii) to fetch a second portion of the given content for immediate real-time consumption, and, in response, to prefetch the first portion via the second CDN and fetch the second portion via the first CDN.

8. The apparatus according to claim 7, wherein the one or more processors are configured to estimate a likelihood that the user will consume the second portion of the given content, and to fetch the second portion of the given content only in response to the likelihood being greater than a threshold.

9. A computer software product for use with a first content delivery network (CDN) and a second CDN that are used by a content source for distributing content, the product comprising a tangible non-transitory computer-readable medium in which program instructions are stored, which instructions, when read by one or more processors, cause the one or more processors to:
identify cases in which a user device is requesting to obtain a given content from the content source, and distinguishing between (i) cases in which the given content is prefetched before being requested by a user of the user device, and (ii) cases in which the same given content is fetched in response to a request from the user for immediate real-time consumption;
in the cases in which the user device is requesting to fetch the given content for immediate real-time consumption by the user, fetching the given content to the user device via the first CDN used by the content source for distributing the given content; and
in the cases in which the user device is requesting to prefetch the given content before the given content is requested by the user, prefetch the given content to the user device via the second CDN, which is also used by the content source for distributing the same given content, wherein the second CDN is slower than but has a lower cost-per-volume-of-content than the first CDN,
wherein distinguishing between the cases is performed by a processor in the user device.

* * * * *